United States Patent
Josso et al.

(10) Patent No.: US 9,497,730 B2
(45) Date of Patent: *Nov. 15, 2016

(54) MEASUREMENT GAPS TRIGGERING FOR A MULTI SIM MOBILE DEVICE

(75) Inventors: Nicolas Josso, La Chapelle Saint Fray (FR); Erwan Preteseille, Arnage (FR); Sylviane Roullier, Le Mans (FR)

(73) Assignee: ST-Ericsson SA, Plan-les-Ouates (CH)

( * ) Notice: Subject to any disclaimer, the term of this patent is extended or adjusted under 35 U.S.C. 154(b) by 291 days.

This patent is subject to a terminal disclaimer.

(21) Appl. No.: 14/111,441

(22) PCT Filed: Apr. 10, 2012

(86) PCT No.: PCT/EP2012/056473
§ 371 (c)(1),
(2), (4) Date: Mar. 25, 2014

(87) PCT Pub. No.: WO2012/140023
PCT Pub. Date: Oct. 18, 2012

(65) Prior Publication Data
US 2014/0248922 A1   Sep. 4, 2014

Related U.S. Application Data

(60) Provisional application No. 61/481,443, filed on May 2, 2011.

(30) Foreign Application Priority Data

Apr. 12, 2011  (EP) ..................................... 11305429

(51) Int. Cl.
*H04M 1/00* (2006.01)
*H04W 68/02* (2009.01)
*H04W 60/00* (2009.01)
(Continued)

(52) U.S. Cl.
CPC ........... *H04W 68/02* (2013.01); *H04W 60/005* (2013.01); *H04W 88/06* (2013.01); *H04W 36/0088* (2013.01)

(58) Field of Classification Search
USPC ....................................... 455/552.1
See application file for complete search history.

(56) References Cited

U.S. PATENT DOCUMENTS 6,850,774 B1   2/2005 Cashman
2007/0003760 A1   1/2007 Crook et al.
(Continued)

FOREIGN PATENT DOCUMENTS

WO   2005064972 A1   7/2005
WO   WO2007053851 A2   5/2007
(Continued)

*Primary Examiner* — Muthuswamy Manoharan
(74) *Attorney, Agent, or Firm* — Coats & Bennett, P.L.L.C.

(57) ABSTRACT

There is described a multiple subscriber identity arrangement comprising a modem (10) and a control unit (13) associated with said modem. The modem is capable of receiving and/or transmitting messages related to either one of at least first and second subscriber identities, but not simultaneously. The control unit is configured to, when communication activity associated with the first subscriber identity is being performed (S1) by the modem, cause the modem to send (S3) an indication to a network associated with the first subscriber identity requesting compressed mode. The control unit is further configured to monitor the signalling associated with the second subscriber identity during a compressed mode gap associated with the first subscriber identity.

12 Claims, 4 Drawing Sheets

(51) Int. Cl.
 *H04W 88/06* (2009.01)
 *H04W 36/00* (2009.01)

(56) References Cited

U.S. PATENT DOCUMENTS

2009/0156257 A1 6/2009 Shi
2009/0312020 A1 12/2009 Lee
2011/0117965 A1* 5/2011 Gong .................... H04W 48/18
 455/558
2012/0190362 A1* 7/2012 Subbarayudu ...... H04W 76/048
 455/435.1

FOREIGN PATENT DOCUMENTS

WO 2008085952 A1 7/2008
WO 2010140781 A2 12/2010

* cited by examiner

MEASUREMENT GAPS TRIGGERING FOR A MULTI SIM MOBILE DEVICE

TECHNICAL FIELD

The present invention generally relates to devices and methods for the triggering of measurement gaps for a multiple Subscriber Identities Modem (e.g., Multi SIM) in a terminal of a cellular telecommunication network. It concerns more particularly the management of measurement activities and/or paging reception for devices capable of receiving messages relating to two or more subscriber identities, but not simultaneously, while the device is in a dedicated mode of operation on one subscriber identity.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Mobile devices adapted for Multi SIM application are now becoming available to end users. A benefit of such mobile devices for the user is that the user should be able to receive calls on several subscriptions using a single device.

For example, a Dual SIM Dual Standby (DSDS) terminal comprises means for receiving/sending messages associated with at least two subscriber identities. The at least two subscriber identities may be associated with the same or different cellular networks, and may be using the same or different Radio Access Technologies (RAT).

However, typical DSDS mobile devices have generally only one radiofrequency (RF) module and/or only one baseband (BB) module, that can be shared by the two Subscriber Identities (SI) in Idle Discontinuous Reception (Idle-DRX) mode, but that are able to manage only one SI at each moment in time in idle no-DRX modes and in dedicated modes. Therefore, as soon as a SI is active (for signalling with the network, or for voice call or packet transfer, for example), the other SI becomes out of range with respect to the network, typically leading to missed calls on said other SI. This limitation typically involves low performance of such devices in terms of Mobile Terminated (MT) call setup from the user point of view (i.e. a high missed call rate).

In addition, after a call on one SI has ended, for instance, the User equipment (UE) may spend some time recovering network access for the other SI, thus further degrading the incoming call reception rate.

Document EP2119272 discloses that a method for taking measurements by a UE during a measurement gap begins with taking UE-specific measurements. The UE requests a measurement gap from a wireless network, the request including the UE-specific measurements. The UE receives measurement gap information from the network, including when the measurement gap is scheduled. Finally, the UE takes the measurements during the scheduled measurement gap.

In WO 2007/053851 there are described mechanisms and methods that facilitate preparation of inter-RAT and/or inter-frequency handover with respect to a mobile device. A UE can indicate to a network servicing the UE that the UE desires to perform measurements with respect to a different frequency and/or different RAT. Data on the downlink channel can then be scheduled to ensure that data intended for the UE is not lost while the UE is performing the measurement.

There is a need for methods and devices that allow a multiple subscriber identity mobile phone (having at least a first and second SI) with a one receiver/transmitter configuration to perform measurements (e.g. to monitor the cellular context) associated with the second SI nor to receive paging messages related to the second SI when the UE is in dedicated mode on the first SI.

Embodiments of the present invention will improve the situation.

SUMMARY

A first aspect of the present invention relates to a multiple subscriber identity arrangement comprising a modem and a control unit associated with said modem,
  wherein the modem is capable of receiving and/or transmitting messages related to at least a first subscriber identity and a second subscriber identity, but not simultaneously; and,
  wherein the control unit is configured to
    when communication activity associated with the first subscriber identity is being performed by the modem, cause the modem to send an indication to a network associated with the first subscriber identity leading to the network activating compressed mode operation; and,
    monitor signalling associated with the second subscriber identity during a compressed mode gap associated with the first subscriber identity.

Monitoring signalling may, for example, comprise monitoring cellular context/environment and/or reading paging.

Thus, the arrangement may take advantage of compressed mode for obtaining creation of gaps in its activity on the first subscriber identity which are needed for performing activities on the second subscriber identity.

The communication activity associated with the first subscriber identity can be any communication activity. It may include voice communication, data exchange (e.g., SMS), internet browsing, etc. It may include background activity related to at least one signalling procedure. For instance, the signalling procedure may include at least one of Location Area Update (LAU) and Routing Area Update (RAU).

The communication activity associated with the first subscriber identity may also include background activity generated by at least one application running in at least one dedicated mode of operation associated with the first subscriber identity. For instance, the running application may include at least one of email retrieval, synchronization of email box, calendar and/or contacts, checking for news flash information, updating of reoccurring data such as weather forecast and/or financial data, and software and/or security updates.

The activities associated with the second SI which are handled in compressed gaps of the first SI are preferably activities which can be done asynchronously. As opposed to synchronous activity, one example definition of asynchronous activity is that it is an activity which can be executed with low accuracy timing constraints. Such low accuracy timing constraints may be due to that the activity only needs one gap at any time for the execution (example activities include e.g. RSSI activities and FCH). The low accuracy timing constraints may alternatively or additionally be due to that the activity has a high repetition rate and matches in gaps thanks to repetition of procedure (example activities include e.g. SCH).

In some embodiments, however, the signalling associated with the second subscriber identity may comprise paging messages conveyed over a paging channel associated with the second subscriber identity. The control unit may then be configured to cause the modem to monitor said paging channel associated with the second subscriber identity during at least one paging occasion associated with the second subscriber identity falling within the compressed mode gap associated with the first subscriber identity. Because the paging occasions associated with the second subscriber identity have accurate timing positions synchronous with the corresponding network, this can occur only if the compress gap allocated on the first SI are in synchronism with the Paging Channel associated with the second SI.

The control unit may be further configured to, when the paging message received on the paging channel associated with the second subscriber identity contains a call setup request cause the modem to interrupt the ongoing communication activities associated with the first subscriber identity and switch to the second subscriber identity to answer the call setup request.

In a variant, the control unit may be configured to, when the paging message received on the paging channel associated with the second subscriber identity contains a call setup request:

a/ prompt the user and selectively cause the modem to interrupt the ongoing communication activities associated with the first subscriber identity and switch to the second subscriber identity to answer or not the call setup request responsive to an action by the user; or, b/ have an automated selection algorithm selectively cause the modem to interrupt the ongoing communication activities associated with the first subscriber identity and switch to the second subscriber identity to answer or not the call setup request; or c/ perform steps a/ for at least one some class of communication activities associated to the first subscriber identity and perform step b/ for at least another class of communication activities associated to the first subscriber identity.

In some embodiments, the control unit may be further configured to resume the communication activities associated to the first subscriber identities in normal mode after the activities associated with the second subscriber identity, e.g., the measurements or the call associated with the second subscriber identity which has been answered are over.

In some embodiments, the signalling associated with the second subscriber identity comprises signalling for performing measurements associated with the second subscriber identity, and the control unit may be configured to cause the modem to perform said measurements associated with the second subscriber identity within the compressed mode gap associated with the first subscriber identity.

The measurements may pertain to at least one of Intra-frequency, inter-frequency and inter-RAT mobility.

The multiple subscriber identity arrangement may further comprises a paging schedule memory configured to have knowledge of a scheduling of signalling occasions for at least the second subscriber identity associated with the modem.

A second aspect of the present invention relates to a mobile device comprising a multiple subscriber identity arrangement as defined above, and a reception/transmission block coupled to the modem of the multiple subscriber identity arrangement for receiving and/or transmitting signals.

A third aspect of the present invention relates to a method of controlling a multiple subscriber identity arrangement having a modem and a control unit associated with said modem wherein the modem is capable of receiving and/or transmitting messages related to at least two subscriber identities, but not simultaneously, the method comprising the control unit:

when communication activity associated with the first subscriber identity is being performed by the modem, send an indication to a network associated with the first subscriber identity leading to the network activating compressed mode of operation; and, monitor signalling associated with the second subscriber identity during a compressed mode gap associated with the first subscriber identity.

A fourth aspect of the present invention relates to a computer program product comprising a computer readable medium, having thereon one or more stored sequences of instructions being loadable into a processor and adapted to cause, when executed by the processor, execution of the steps of the method.

It should be noted that embodiments of the invention are equally applicable to dual SIM devices and multiple SIM devices with three or even more subscriber identities.

Also, even though the subscriber identities typically reside in local memory areas of SIM cards which are physically inserted into corresponding SIM card readers in a mobile terminal; this must not be the case in all embodiments. In some embodiments, the subscriber identities may be provided to the mobile terminal in the form of a SIM software application executed in the terminal, and/or as a virtual SIM which is "stolen" or "borrowed" from another device and is rendered accessible to the terminal by way of a (wireless or other) interface.

Furthermore, it should be noted that embodiments of the invention are equally applicable to mobile terminals as to stationary devices associated with a cellular telecommunication network (e.g. routers, power consumption meters, home alarms, etc). Such stationary devices are configured to be connected to a cellular communication network and are, when connected, seen as terminals by the network.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF EMBODIMENTS

Figure 1:
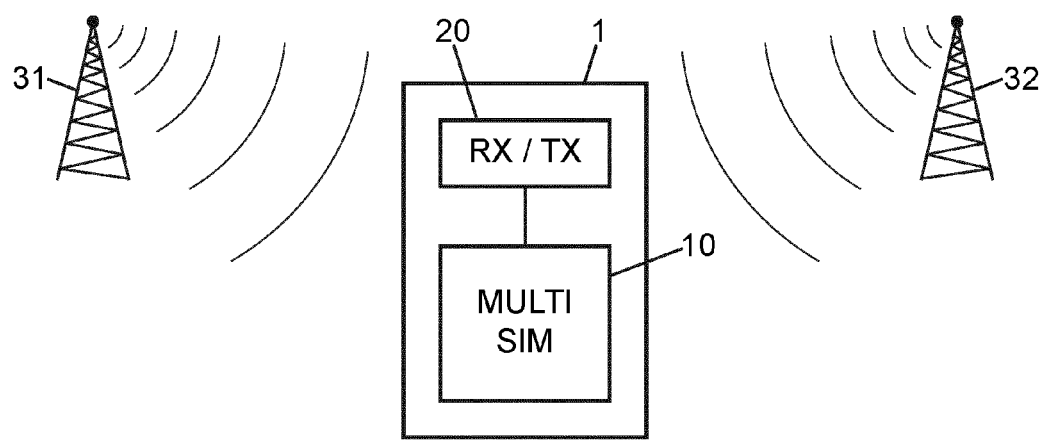
FIG. 1 is a schematic block diagram of a mobile device according to embodiments of the invention.

DSDS mobile phones behaviour is not described in any Standard. For this reason, Universal Mobile Telecommunication System (UMTS) Wideband-Code Division Multiple Access (W-CDMA) DSDS mobile phones, for instance, are based on the 3$^{rd}$ Generation Partnership Project (3GPP) Standard that, however, do not describe dual SIM (e.g. DSDS) use cases and hence do not provide any solution enabling monitoring of e.g. the context of a second SI and/or reading paging information on said second SI and/or performing any other measurements if the device is in a dedicated mode on a first SI. Some references are made to UMTS W-CDMA in this description. It should be noted, however, that similar descriptions are applicable to TDD versions of 3GPP UMTS and that embodiments of the invention are equally applicable to such situations and other applicable standards.

For instance, 3GPP Technical Specification 25.331, "Radio Resource Control" (RRC), provides that paging of idle mode UE is controlled by the paging and notification control function entity (PNFE), but is absolutely silent as to paging of one SI in a device equipped with a multi SIM when the device is in a dedicated mode on another SI.

In particular, when the multi SIM terminal is in a dedicated reception/transmission mode on a first SI, it is not provided with any measurement gaps in which it may be tuned to a second SI to monitor a Paging Channel (PCH) associated with said second SI and/or to perform measurements related to said second SI.

Embodiments of the invention allow monitoring the cellular context on the second SI so that when the communication activities on the first SI are complete, a cell belonging to the second SI can be found faster, thus enabling, e.g., a paging channel associated with the second SI to be read faster.

Embodiments of the invention also allow improving the MT call setup rate from the end user point of view, within a mobile device with one single reception/transmission chain being able to operate at a time. In particular, embodiments of the invention allow reducing missed calls in DSDS mobile phones by reading PCH data blocks on one SI while the modem is performing communication activities on the other SI (e.g., voice call, signalling or background activities).

The RRC protocol belongs to the UMTS protocol stack and handles the control plane signalling of Layer 3 between the User Equipment (UE) and the Universal Terrestrial Radio Access Network (UTRAN). It includes, in particular, functions for connection establishment and release, and functions for Paging notification and release. Typically, there can only be one RRC connection open to a UE at any one time.

As defined in UMTS TS 25.331, the UE is basically in the RRC idle mode, which corresponds to a "no connection" state and has the lowest energy consumption. When having some exchange with the network, the UE can be in a dedicated mode. In a typical implementation the states in the RRC dedicated mode are Dedicated Channel (CELL_DCH) state, which corresponds to a connected mode, Forward Access Channel (CELL_FACH) state, Cell Paging Channel (CELL_PCH) state and UTRAN Registration Area Paging Channel (URA_PCH) state.

When in the CELL_DCH mode, the single receiver UE cannot perform any measurements on any other frequency or radio access technology or related to another subscriber identity.

In order to allow the UE carrying out measurements on other frequencies, the 3GPP standard provides for a specific operating mode referred to as compressed mode. Similar modes exist in other standards (and may come to exist in future standards) and embodiments of the invention are equally applicable for such situations.

In this mode, the UE is told by the network to perform measurement on some other frequency or radio access technology. The network thus schedules transmission/reception gaps, called compressed mode gaps because the UE is forced into a compressed mode, responsive to a given event indicated by the UE. According to the UMTS TS 25.331, such measurements include intra-cell, inter-cell and inter-RAT measurements on Neighbor UMTS and GSM cells. The compressed mode is activated in the mobile phone by way of signaling during call setup or while a measurement is being configured. The settings for this mode are made in a compressed mode pattern sequence Compressed mode may, in fact, not be thought of as an actual mode as such in some views. Compressed mode may typically refer to a situation where the UE is required (typically by the network) to transmit the same amount of information in less time compared to other "modes". This typically leads to a higher transmission power.

In the compressed mode, gaps are configured into the UE reception and/or transmission activity without impairing the useful data rate. This can be done in various ways, e.g. by reducing the spreading factor. The spreading factor indicates the ratio of CDMA chips to data bits and is typical of CDMA systems. Reducing the spreading factor usually results in a higher data rate. When the spreading factor is reduced, the data rate is briefly increased immediately ahead of and after the signal gap. Another way of implementing the compressed mode is to reduce the number of redundant bits that the channel coder inserts into the data stream. This method, which is also known as puncturing, can be used only for signals transmitted to the UE. The third way of generating gaps in the signal is by higher layer scheduling.

The idea underlying embodiments of the invention is to force the UE to indicate an event when it is active on one SI, possibly under certain conditions, so that the network schedules compressed mode gaps, thus allowing the UE to perform measurements on the other SI and, if needed and possible, read paging messages associated to the second SI.

Such an event can take the form of a measurement report sent by the UE to the network, indicating that it needs activation of the compressed mode to perform requested/required measurements. This may comply with existing schemes as described in 3GPP TS25.331.

The above mentioned "certain conditions" may, e.g., relate to the nature of the communication activities ongoing on the first SI. For instance, one may provide that activation of the compressed mode may is possible only when the UE is performing background activities on the first SI.

FIG. 1 shows a mobile device 1, for example a mobile phone, according to possible embodiments. Mobile device 1 comprises a multi subscriber identity modem 10, for example a Dual SIM Dual Standby (DSDS) modem, and a single reception/transmission (Rx/Tx) block 20 adapted to receive and/or transmit signals in respect of only one subscriber identity (SI) at a time. The reception/transmission block 20 may comprise an antenna system, and a single radio transmitter (Tx) and a single radio receiver (Rx). There may be more Rx and/or Tx, but only one of them being operable at a time. In some embodiments, such limitation may stem from the fact that the Rx/Tx block of the mobile device comprises only one base band (BB) module.

In the following description of embodiments, we shall limit ourselves to consider one example where two subscriber identities are associated with two cellular networks. It is in no way intended to limit the scope of possible embodiments. Indeed, the at least two subscriber identities may be associated with the same or different cellular networks, and may be using the same or different Radio Access Technologies (RAT) as mentioned above. In some cases, each subscriber identity is defined by the content data stored in a Subscriber Identity Module (SIM), but other alternatives exist as also elaborated on above. However, for reasons of conciseness of the following description, a first and a second subscriber identity shall sometimes be referred to by SIM#1 and SIM#2, respectively.

FIG. 1 thus illustrates a use case considered here, wherein both a first base station 31 belonging to a first cellular network and a second base station 32 belonging to a second cellular network, are in the direct vicinity of the mobile device 1. Thus, modem 10 is capable of listening to the two cellular networks, selectively through either one of the fixed network equipments 31 or 32, respectively, but not simultaneously. In other words, modem 10 may receive or emit messages managed by the first cellular network, and (but not at the same time) receive or emit messages managed by the second cellular network, via the respective base stations 31 and 32.

Consequently, the mobile device 1 is obliged to slice its radio opening time between the different subscriber identities. Consequently, as soon as a subscriber identity is active (e.g. for signalling with the network, for voice call or packet transfer), the other subscriber identity becomes out of service with respect to the network.

In what follows, further, we shall consider situations where communication activities are being performed by the modem on any one of the subscriber identities, for example background activities or foreground activities. These two kinds of activities are to be understood as follows.

Foreground activities, such as an ongoing voice call, video call, web browsing or receipt of a live audio or video stream, are activities typically induced by the end user. A foreground activity is thus an activity which the user is very likely taking active part in.

On the contrary, background activities occur in the mobile device without any active participation by the user, and usually without the user being even aware of it. Examples of background activities are applications running in dedicated modes, such as email retrieval, synchronization of email box, calendar and contacts, checking for news flash information, updating current weather forecast and financial data, and software and security updates, etc. For instance, a background activity is an activity the interruption of which will not even be noticed the end user, or will not be considered as a drawback by the user compared with the advantage of not missing incoming calls on another subscriber identity.

Other definitions of foreground and background activities may be practiced within the scope of embodiments of the invention. For example, some non urgent activities (e.g. email retrieval, server connections maintenance, etc.) may be defined as background activities by contrast with other more urgent activities (e.g. telephone calls) which shall then qualify as foreground activities.

Communication activities can generally be sorted into two or more classes, each of which may be given a priority in relation to the other classes. How the invention is practiced can then be based on the classes. For instance, paging messages may belong to a class which causes that it will always be listened to if at all possible, or only if the ongoing communication activity on the first SI is of a certain class, e.g. a lower priority class like a class associated with background activities. More generally, the line of action if a call setup request is received for the SIM#2 may depend on the class of ongoing activity on SIM#1 and/or on the class of requested activity on SIM#2.

Figure 2:
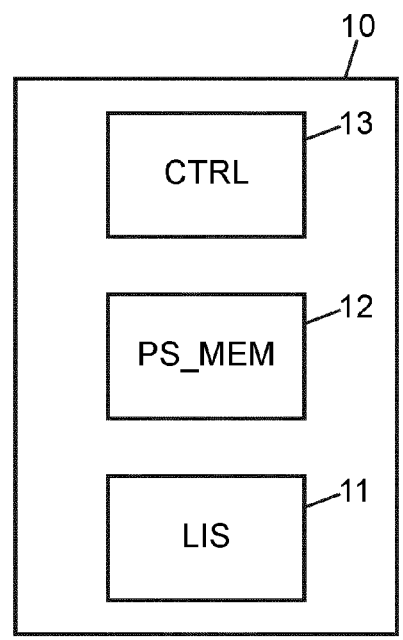
FIG. 2 is a schematic block diagram of a multi SIM arrangement according to some embodiments of the invention, that may be comprised in the mobile device.

In the embodiment represented in FIG. 2, the modem 10 comprises a listening block 11 for listening to messages, for example paging messages and other signalling messages, associated with a plurality of different subscriber identities (from the same or a plurality of different cellular networks and/or using the same or a plurality of different Radio Access Technologies (RAT)). In this example, modem 10 further comprises a paging schedule memory 12 configured to have knowledge of a scheduling of the paging occasions for each of the subscriber identities associated with the modem. Such knowledge may encompass the radio parameters associated with the paging channel on SIM#1 and SIM#2, acquired e.g. when the modem is in idle mode on both SI. The modem 10 further comprises a control unit 13 configured to control the radio opening time for each subscriber identity, e.g. for monitoring radio communication physical and/or logical channels related to one subscriber identity at some given times and related to a second subscriber identity at other given times. In other embodiments, the control unit may be external to the modem.

Figure 3A:
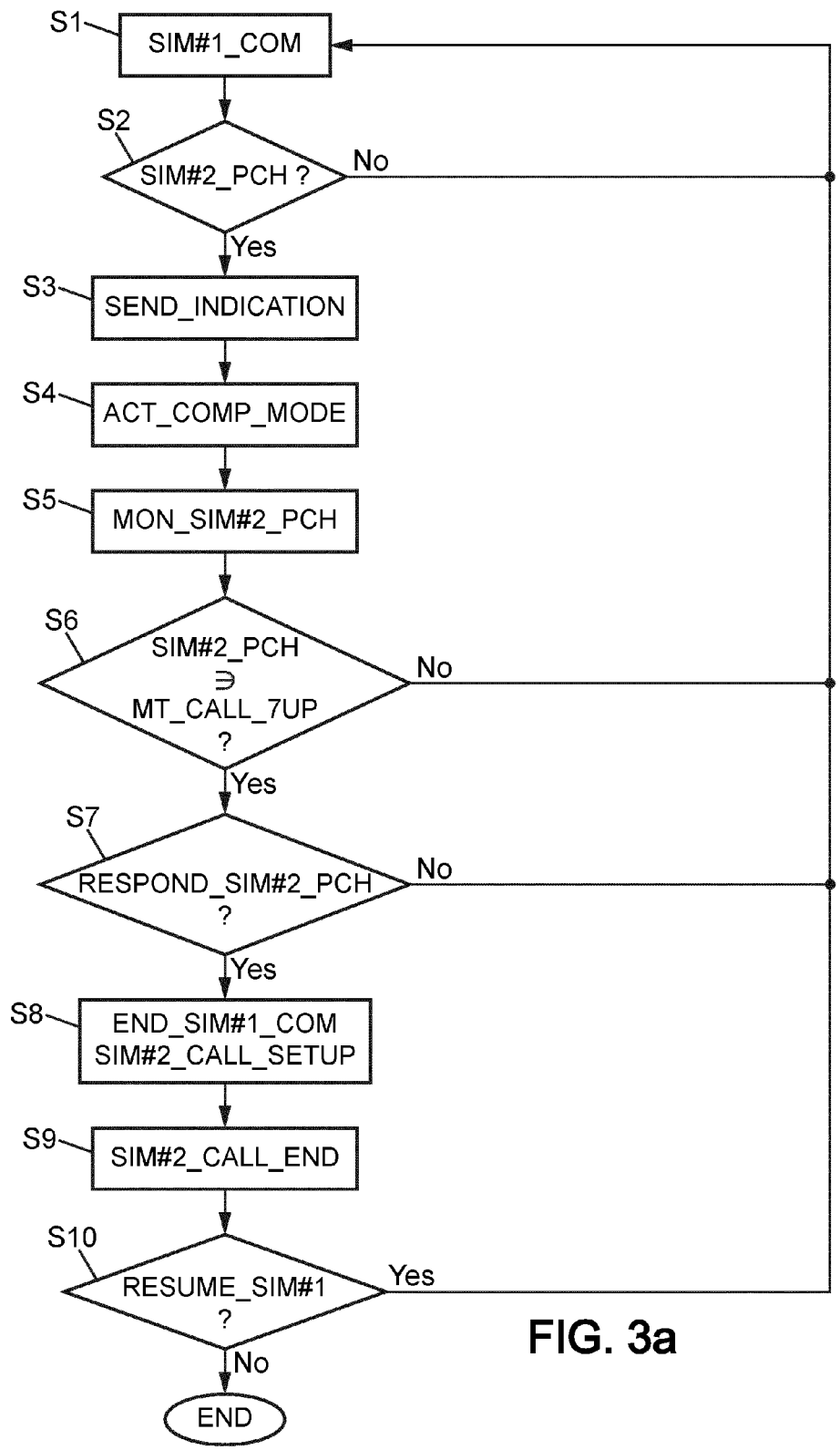
FIG. 3a and FIG. 3b are a flow charts showing steps of method of managing the multi SIM arrangement, according to embodiments of the invention; and, FIG. 4 is a chart which shows messages exchanged within the mobile device and between the mobile device and the network associated with the first subscriber identity for requesting compressed gaps.

Referring to FIG. 3a, there will be described steps of a method of controlling a dual subscriber identity modem (dual-SIM) according to some embodiments wherein the activities associated with SIM#2 are tied to paging.

The one with ordinary skills in the art will identify that the process herein described is also applicable to a modem supporting more than two subscriber identities, for instance:
  when the modem is active on one SI and several other SI need to listen to their respective paging channels;
  when the modem is active on several SI using respective RF receivers and one further SI needs to listen to its paging channel (e.g. a 3-SIM phone with only 2 Rx.); or,
  when the modem is active on several SI using respective RF receivers and several other SI need to listen to their respective paging channels.

In step S1 of FIG. 3, the modem performs any communication activities on a first subscriber identity SIM#1. Examples of such communication activities may be the transmission or reception of voice call or signalling information to and/or from the network associated with the first subscriber identity. Other examples pertain to the execution of background applications running on SIM#1. The mobile device may be in dedicated mode, such as DCH mode, for instance, on SIM#1.

In step S2, and while the activity on SIM#1 is ongoing, it is determined (e.g. by the control unit 13 of the modem 10) whether there are time slots of the Paging Channel (PCH) on the second subscriber identity SIM#2, i.e., paging occasions associated with the second SI. This may, for example, be performed using data stored in the paging schedule memory 12 of the modem 10. More generally, step S2 may comprise the control unit determining whether there is a need for performing activities associated with SIM#2, e.g., PCH reading on SIM#2 to the extent that is made possible by the synchronization of such PCH occasions on SIM#2 with respect to the timing of the occurrences of compressed gaps on SIM#1.

If the test of steps S2 is positive, i.e., when a paging occasion on SIM#2 occurs, then the algorithm continue with step S3. Else, the algorithm returns to step S1.

At step S3, activation of the compressed mode is requested from the network by the UE. This may take the form of any indication to the network for a gap request, e.g.

by way of signalling while the reception/transmission activities associated with SIM#1 are still ongoing. The settings for the compressed mode are made in a standard way. Indeed, the carrying out of this step is similar to the request for compressed mode described in 3GPP TS 25.331, except that the activation of the compressed mode is decided by the network in response to an implicit request done by the UE which may take the form of an indication sent by the modem of the UE in consideration of activities to be performed on SIM#2 instead of being dictated by measurements to be performed on SIM#1 as envisioned in 3GPP TS 25.331.

At step S4, the network activates the compressed mode. In the compressed mode, gaps are inserted into the ongoing reception/transmission activities of the UE without impairing the useful data rate for these activities on SIM#1. In other words, the network sets up compressed mode with the UE (and communicate the compressed mode settings to that UE) and the UE can perform the activities on either or both of SIM#1 (as requested by the network) and SIM#2 as desired by UE.

At step S5, the modem 10 is controlled by the control unit 13 to temporarily switch to SIM#2 during at least one compressed gap provided in the communication activities on SIM#1 due to the activation of the compressed mode by the network. In the present example, the UE uses this gap to monitor the paging channel of SIM#2 during said gap, to read a PCH block associated with the second subscriber activity.

It should be noted that in a typical application, the compressed mode pattern does not necessarily coincide with the paging occasions. Thus, UE cannot be certain that SIM#2 paging can be read before the compressed mode pattern is known. Thus, in some typical embodiments, timing information of the paging occasions is identified in step S2, and only after having received compressed mode activation and pattern in step S4, the UE knows if (by chance) it is possible to read the page for SIM#2. Therefore, a more likely use of the current invention is in situations where measurements need to be performed for SIM#2 (see e.g. FIG. 3b). At step S6, it is then determined whether a received PCH block contains a request for MT call setup on User Equipment (UE) side. If no, then the algorithm returns to step S1 so that reception/transmission activities on SIM#1 are continued.

If yes, step S7 may offer to possibility to determine whether the call is to be responded on SIM#2. If yes, then the process continues with step S9, otherwise it continues with step S11. Step S7 may be carried out according to several alternatives.

Indeed, when there is an incoming call in SIM#2, the control unit may be configured to:
  prompt the user and allow him to decide whether or not to interrupt the communication activities ongoing on SIM#1 to answer the SIM#2 incoming call, e.g. through an appropriate user interface of the mobile phone; or,
  cause an automated selection algorithm (e.g. based on categorising communication types into different priorities) decide whether or not to interrupt the communication activities ongoing SIM#1 to answer the call on SIM#2; or
  combine the two above alternatives (e.g. ask the user for some classes of SIM#1 communication activities and select automatically for other classes).

For example, there might be provided a setting in the phone to let the user decide whether or not, and such being the case for which classes of activities, the packet transfer for the activities on one SI shall be interrupted by any call on the other SI. In a variant, the phone may have it hard coded to always apply one of the above schemes.

If it is decided at step S7 not to respond to the paging request on SIM#2, the process returns back to step S1 to resume communication activities on SIM#1.

If, on the contrary, it is decided at step S7 to respond to the paging request on SIM#2, then, at step S8, the communication activities on SIM#1 are ended and a call setup is performed on SIM#2 according to parameters of the second subscriber identity. Then, the algorithm continues with step S9.

At step S9, the communication activities on SIM#2 reach an end when the received call is over.

At step S10, it may be determined whether or not to resume the communication activities on SIM#1. This may be particularly useful for background activities like the downloading of software updates or re-occurring information like weather forecast information. If yes the process returns to step S1, else the process ends up.

Figure 3B:
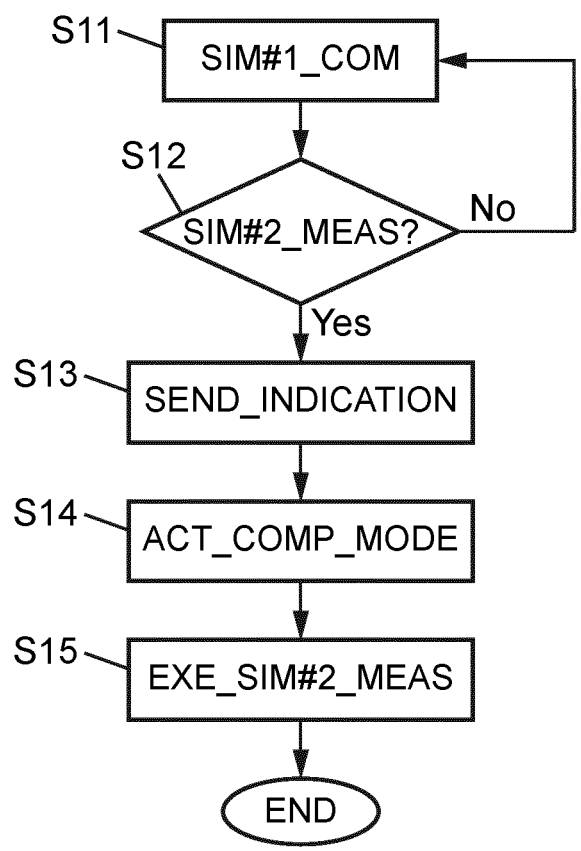

Turning now to FIG. 3b, there will be described steps of a method of controlling a dual subscriber identity modem (dual-SIM) according to other embodiments wherein the activities associated with SIM#2 are tied to measurements. Step S11, S13 and S14 of FIG. 3b is similar to step S1, S3 and S4, respectively, of FIG. 3a, and shall not be described again in details.

In step S11, the modem performs any communication activities on the first subscriber identity SIM#1. The mobile device may be in dedicated mode, such as DCH mode, for instance, on SIM#1.

In step S12, and while the activity on SIM#1 is ongoing, it is determined (e.g. by the control unit 13 of the modem 10) whether there are some activities to be performed on the second subscriber identity SIM#2 preferably but not necessarily, cellular context monitoring on SIM#2 like, i.a., intra-cell, inter-cell and inter-RAT measurements on neighbour UMTS and/or GSM cells, or any other cellular environment measurements.

If the test of steps S12 is positive, e.g., when a measurement is configured on SIM#2, then the algorithm continues with step S13. Else, the algorithm returns to step S11.

At step S13, activation of the compressed mode is requested from the network by the UE. Reference is made to the comments which have been provided above in connection with step S3 of FIG. 3a.

At step S4, the network activates the compressed mode. In the compressed mode, gaps are inserted into the ongoing reception/transmission activities of the UE without impairing the useful data rate for these activities on SIM#1. In other words, the network sets up compressed mode with the UE (and communicate the compressed mode settings to that UE) and the UE can perform the measurements on either or both of SIM#1 (as requested by the network) and SIM#2 as desired by UE.

At step S5, the modem 10 is controlled by the control unit 13 to temporarily switch to SIM#2 during at least one compressed gap provided in the communication activities on SIM#1 due to the activation of the compressed mode by the network. In the present example, the UE uses this gap to perform e.g. intra-cell, inter-cell or inter-RAT measurement activities associated with SIM#2.

The advantage of performing such measurements while activities on SIM#1 are ongoing, is that when SIM#1 goes idle e.g., after communication activities are finished, SIM#2 mobility parameters and other parameters are up to date so that not a lot of time needs to be spent to set up SIM#2 as would be necessary if it was a power on situation.

Figure 4:
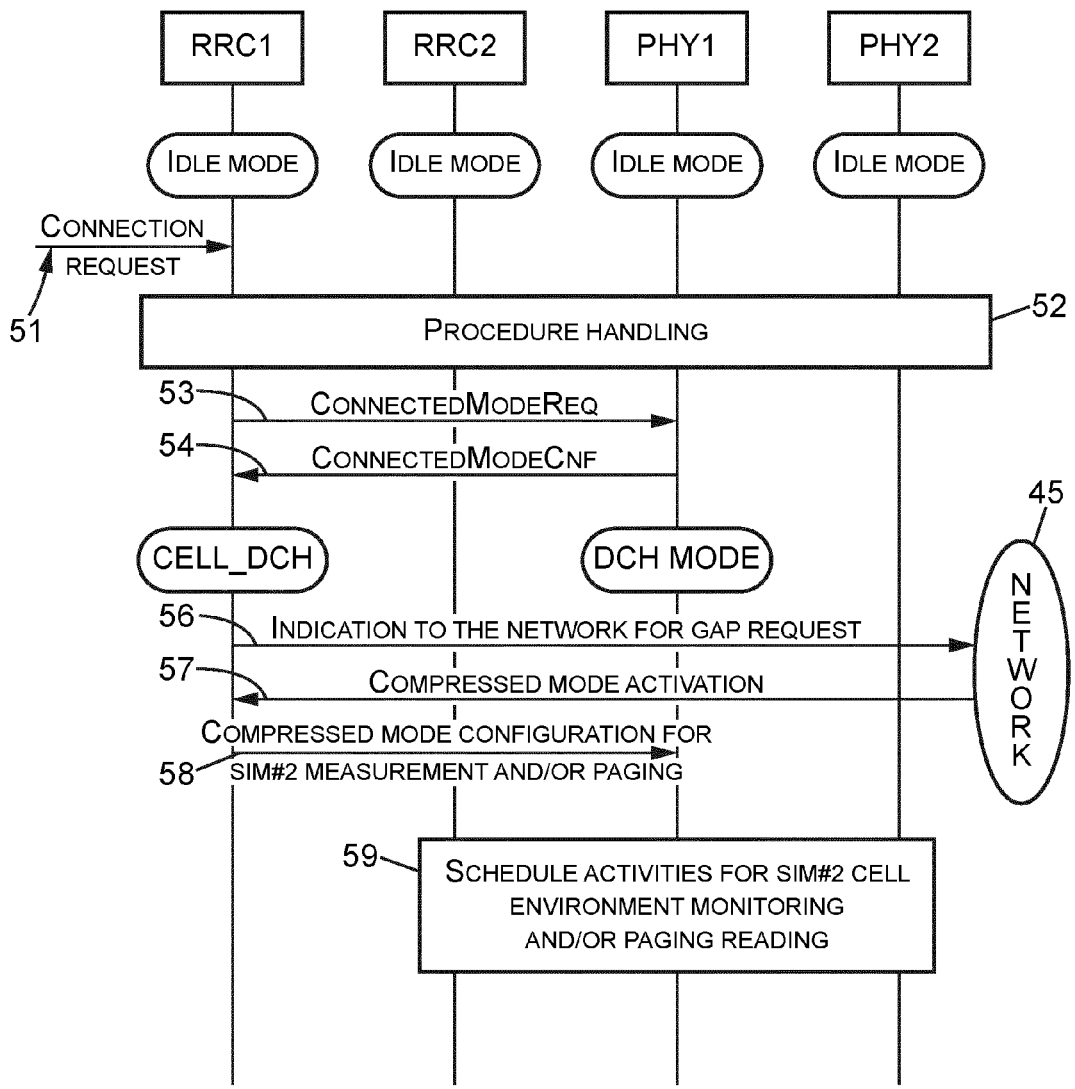

With reference to FIG. 4, there will now be described an example of implementation of the method within a dual SIM mobile device.

FIG. 4 shows messages exchanged between the stacks of protocol layers of the two subscriber identities of the mobile device, and the network 45 associated with the first subscriber identity. The first and third columns from the left of the figure (RRC1 and PHY1, respectively) represent the RRC layer and the Physical layer, respectively, of the first subscriber identity SIM#1. Similarly, the second and fourth columns from the left of the figure (RRC2 and PHY2, respectively) represent the RRC layer and the Physical layer, respectively, of the second subscriber identity SIM#2.

Starting from a situation wherein the modem is in Idle mode on both SIM#1 and SIM#2, the RRC1 receives a connection request 51 from the upper layers.

After handling of the connection procedure 52, RRC1 sends to PHY1 an order 53 to enter a connected mode, namely a "ConnectedModeReq" message. Upon receipt of the "ConnectedModeConf" message from PHY1, which confirms that said layer has entered into the DCH mode, the RRC1 is placed in the Cell_DCH state. The modem is then active in the dedicated (connected) mode on SIM#1.

When, based e.g. on the knowledge of measurements related to the other subscriber identity SIM#2 or on PCH occasions associated to SIM#2, the modem needs to create a gap for performing activities on SIM#2, the following procedure is performed at the initiative of RRC1.

First, RRC1 sends an indication 56 to the network 45 of SIM#2, implicitly requesting compressed mode gaps. The indication 56 may, for example, comprise a measurement report containing a value leading to the network activating compressed mode. The value may, for example, be a fabricated value not based on true measurements. This may follow the routine described in 3GPP TS 25.331.

Upon activation 57 of the compressed mode by network 45, RRC1 sends to PHY1 configuration parameters for compressed mode. The gaps of the compressed mode for SIM#1 allow measurements and/or PCH monitoring on SIM#2.

Finally, the modem performs tasks 59 corresponding to the scheduled activities on SIM#2, like cell environment monitoring or paging reading within the compressed gaps.

The present invention can also be embedded in a computer program product, which comprises all the features enabling the implementation of the methods described herein, and which—when loaded in an information processing system—causes the information processing system to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A modem operative to support multiple subscriber identities, the modem comprising one or more processing circuits configured to:
communicate messages related to either one of at least first and second subscriber identities, but not simultaneously, wherein communicating messages comprises receiving messages, transmitting messages, or both;
when communication activity associated with the first subscriber identity is being performed by the modem, send an indication to a network associated with the first subscriber identity to cause the network to activate compressed mode operation for the first subscriber identity;
monitor signaling associated with the second subscriber identity during a compressed mode gap associated with the first subscriber identity, wherein the signaling associated with the second subscriber identity comprises paging messages conveyed over a paging channel associated with the second subscriber identity;
cause the modem to monitor said paging channel associated with the second subscriber identity during at least one paging occasion associated with the second subscriber identity falling within the compressed mode gap associated with the first subscriber identity; and
when a paging message received on the paging channel associated with the second subscriber identity contains a call setup request:
(A) prompt the user to obtain input, and based on that input selectively cause the modem to interrupt ongoing communication activities associated with the first subscriber identity and switch to the second subscriber identity to answer or decline the call setup request responsive to an action by the user; or (B) execute an automated selection algorithm to selectively cause the modem to interrupt ongoing communication activities associated with the first subscriber identity and switch to the second subscriber identity to answer or decline the call setup request; or (C) perform (A) for at least one class of communication activities associated with the first subscriber identity and perform (B) for at least another class of communication activities associated with the first subscriber identity.

2. The modem of claim 1, wherein the one or more processing circuits are further configured to, when a paging message received on the paging channel associated with the second subscriber identity contains a call setup request, cause the modem to interrupt ongoing communication activities associated with the first subscriber identity and switch to the second subscriber identity to answer the call setup request.

3. The modem claim 2, wherein the one or more processing circuits are further configured to resume communication activities associated with the first subscriber identities after the call associated with the second subscriber identity which has been answered is over.

4. The modem of claim 1:
wherein the signaling associated with the second subscriber identity comprises signaling for performing measurements associated with the second subscriber identity; and
wherein the one or more processing circuits are configured to cause the modem to perform said measurements associated with the second subscriber identity within the compressed mode gap associated with the first subscriber identity.

5. The modem of claim 4, wherein the measurements associated with the second subscriber identity pertain to at least one of intra-frequency mobility, inter-frequency mobility, inter-RAT mobility, quality, traffic volume, and User Equipment internal and positioning measurements.

6. The modem of claim 1, further comprising a signaling schedule memory configured to store data about a scheduling of signaling occasions for at least the signaling associated with the second subscriber identity.

7. A mobile device comprising:
a receiver/transmitter circuit configured to receive and transmit wireless signals; and
a modem operative to support multiple subscriber identities, the modem comprising one or more processing circuits configured to:
communicate messages related to either one of at least first and second subscriber identities, but not simultaneously, wherein communicating messages comprises receiving messages, transmitting messages, or both;
when communication activity associated with the first subscriber identity is being performed by the modem, send an indication to a network associated with the first subscriber identity to cause the network to activate compressed mode operation for the first subscriber identity;
monitor signaling associated with the second subscriber identity during a compressed mode gap associated with the first subscriber identity, wherein the signaling associated with the second subscriber identity comprises paging messages conveyed over a paging channel associated with the second subscriber identity;

cause the modem to monitor said paging channel associated with the second subscriber identity during at least one paging occasion associated with the second subscriber identity falling within the compressed mode gap associated with the first subscriber identity; and
when a paging message received on the paging channel associated with the second subscriber identity contains a call setup request:
(A) prompt the user to obtain input, and based on that input selectively cause the modem to interrupt ongoing communication activities associated with the first subscriber identity and switch to the second subscriber identity to answer or decline the call setup request responsive to an action by the user; or
(B) execute an automated selection algorithm to selectively cause the modem to interrupt ongoing communication activities associated with the first subscriber identity and switch to the second subscriber identity to answer or decline the call setup request; or
(C) perform (A) for at least one class of communication activities associated with the first subscriber identity and perform (B) for at least another class of communication activities associated with the first subscriber identity.

8. A method of operating a modem to support multiple subscriber identities, the method comprising:
communicating messages related to at least two subscriber identities, but not simultaneously, wherein communicating messages comprises receiving messages, transmitting messages, or both;
when communication activity associated with the first subscriber identity is being performed by the modem, sending an indication to a network associated with the first subscriber identity leading to the network activating compressed mode of operation;
monitoring signaling associated with the second subscriber identity during a compressed mode gap associated with the first subscriber identity, wherein the signaling associated with the second subscriber identity comprises paging messages conveyed over a paging channel associated with the second subscriber identity;
causing the modem to monitor said paging channel associated with the second subscriber identity during at least one paging occasion associated with the second subscriber identity falling within the compressed mode gap associated with the first subscriber identity; and
when a paging message received on the paging channel associated with the second subscriber identity contains a call setup request:
(A) prompting the user to obtain input, and based on that input selectively cause the modem to interrupt ongoing communication activities associated with the first subscriber identity and switch to the second subscriber identity to answer or decline the call setup request responsive to an action by the user; or
(B) executing an automated selection algorithm to selectively cause the modem to interrupt ongoing communication activities associated with the first subscriber identity and switch to the second subscriber identity to answer or decline the call setup request; or
(C) performing (A) for at least one class of communication activities associated with the first subscriber identity and perform (B) for at least another class of communication activities associated with the first subscriber identity.

9. The method of claim 8:
wherein said monitoring signaling associated with the second subscriber identity comprises monitoring said paging channel associated with the second subscriber identity during at least one paging occasion associated with the second subscriber identity falling within the compressed mode gap associated with the first subscriber identity.

10. The method of claim 9, wherein the signaling associated with the second subscriber identity comprises signaling for performing measurements associated with the second subscriber identity, the method further comprising; and
performing the measurements associated with the second subscriber identity within the compressed mode gap associated with the first subscriber identity.

11. The method of claim 10, wherein the measurements associated with the second subscriber identity pertain to at least one of intra-frequency mobility, inter-frequency mobility, inter-RAT mobility, quality, traffic volume, User Equipment internal and positioning measurements.

12. A computer program product stored in a non-transitory computer readable medium for supporting multiple subscriber identities in a modem, the computer program product comprising software instructions which, when run by a modem, configures the modem to:
communicate messages related to either one of at least first and second subscriber identities, but not simultaneously, wherein communicating messages comprises receiving messages, transmitting messages, or both;
when communication activity associated with the first subscriber identity is being performed by the modem, send an indication to a network associated with the first subscriber identity to cause the network to activate compressed mode operation for the first subscriber identity;
monitor signaling associated with the second subscriber identity during a compressed mode gap associated with the first subscriber identity, wherein the signaling associated with the second subscriber identity comprises paging messages conveyed over a paging channel associated with the second subscriber identity;
cause the modem to monitor said paging channel associated with the second subscriber identity during at least one paging occasion associated with the second subscriber identity falling within the compressed mode gap associated with the first subscriber identity; and
when a paging message received on the paging channel associated with the second subscriber identity contains a call setup request:
  (A) prompt the user to obtain input, and based on that input selectively cause the modem to interrupt ongoing communication activities associated with the first subscriber identity and switch to the second subscriber identity to answer or decline the call setup request responsive to an action by the user; or
  (B) execute an automated selection algorithm to selectively cause the modem to interrupt ongoing communication activities associated with the first subscriber identity and switch to the second subscriber identity to answer or decline the call setup request; or
  (C) perform (A) for at least one class of communication activities associated with the first subscriber identity and perform (B) for at least another class of communication activities associated with the first subscriber identity.

* * * * *